United States Patent
Burba et al.

(10) Patent No.: US 9,300,742 B2
(45) Date of Patent: Mar. 29, 2016

(54) BUFFER ORDERING BASED ON CONTENT ACCESS TRACKING

(71) Applicant: MICROSOFT TECHNOLOGY LICENSING, LLC, Redmond, WA (US)

(72) Inventors: Alexander Burba, Seattle, WA (US); Frank R. Morrison, III, Seattle, WA (US); Mehmet Akkurt, Seattle, WA (US); Brandon Hunt, Redmond, WA (US); John Justice, Bellevue, WA (US)

(73) Assignee: MICROSOFT TECHNOLOGY LICENSING, INC., Redmond, WA (US)

( * ) Notice: Subject to any disclaimer, the term of this patent is extended or adjusted under 35 U.S.C. 154(b) by 72 days.

(21) Appl. No.: 13/658,746

(22) Filed: Oct. 23, 2012

(65) Prior Publication Data
US 2014/0114990 A1 Apr. 24, 2014

(51) Int. Cl.
G06F 17/30 (2006.01)
H04L 29/08 (2006.01)

(52) U.S. Cl.
CPC .......... *H04L 67/22* (2013.01); *G06F 17/30828* (2013.01)

(58) Field of Classification Search
CPC ............... G06F 17/30029; G06F 17/30699; G06F 17/30702; G06F 17/30761; G06F 17/30828
USPC ........................ 707/732, 751, 784
See application file for complete search history.

(56) References Cited

U.S. PATENT DOCUMENTS

| | | | |
|---|---|---|---|
| 5,754,938 A * | 5/1998 | Herz et al. | 725/116 |
| 6,085,226 A | 7/2000 | Horvitz | |
| 6,106,395 A | 8/2000 | Begis | |
| 6,400,381 B1 * | 6/2002 | Barrett et al. | 715/758 |
| 6,645,068 B1 | 11/2003 | Petermeier et al. | |
| 7,325,106 B1 * | 1/2008 | Dmitriev et al. | 711/159 |
| 7,614,955 B2 | 11/2009 | Farnham et al. | |

(Continued)

FOREIGN PATENT DOCUMENTS

| | | |
|---|---|---|
| EP | 1244016 A1 | 9/2002 |
| EP | 2264624 A1 | 12/2010 |

OTHER PUBLICATIONS

Yun, et al.,"PADS: Enhancing Gaming Experience Using Profile-Based Adaptive Difficulty System", Retrieved at http://citeseerx.ist.psu.edu/viewdoc/download?doi=10.1.1.192.1158&rep=rep1&type=pdf>>, Sandbox '10 Proceedings of the 5th ACM SIGGRAPH Symposium on Video Games, Jul. 7, 2008, pp. 5.

(Continued)

*Primary Examiner* — Cam-Linh Nguyen
(74) *Attorney, Agent, or Firm* — Aaron Chatterjee; Judy Yee; Micky Minhas

(57) ABSTRACT

Embodiments are disclosed that relate to buffering portions of a digital content item in different orders for different users. For example, one disclosed embodiment provides a method of providing a buffer ordering for a digital content item. The method includes tracking content access information for each user of a plurality of users, the content access information for each user comprising information regarding how content portions of each of one or more digital content items were accessed by the user. The method further comprises providing a different buffer ordering for a first user of a selected digital content item than for a second user based upon the content access information.

17 Claims, 6 Drawing Sheets

(56) References Cited

U.S. PATENT DOCUMENTS

| | | | |
|---|---|---|---|
| 8,118,678 B2 | 2/2012 | Jennings et al. | |
| 8,243,562 B2* | 8/2012 | Yoo et al. | 369/30.03 |
| 8,298,087 B1 | 10/2012 | Smith | |
| 8,554,640 B1 | 10/2013 | Dykstra et al. | |
| 2001/0044850 A1 | 11/2001 | Raz et al. | |
| 2002/0142815 A1 | 10/2002 | Candelore | |
| 2005/0234864 A1* | 10/2005 | Shapiro | 707/1 |
| 2006/0047804 A1* | 3/2006 | Fredricksen et al. | 709/224 |
| 2006/0265403 A1 | 11/2006 | Mercer et al. | |
| 2007/0005646 A1* | 1/2007 | Dumais et al. | 707/104.1 |
| 2007/0041383 A1 | 2/2007 | Banikazemi et al. | |
| 2007/0072678 A1 | 3/2007 | Dagres | |
| 2007/0173324 A1 | 7/2007 | Multerer et al. | |
| 2007/0266311 A1* | 11/2007 | Westphal | 715/526 |
| 2008/0039204 A1 | 2/2008 | Ackley et al. | |
| 2008/0301254 A1 | 12/2008 | Bestler | |
| 2009/0048977 A1 | 2/2009 | Aggarwal et al. | |
| 2009/0138907 A1* | 5/2009 | Wiser et al. | 725/34 |
| 2009/0264202 A1 | 10/2009 | Chen et al. | |
| 2009/0271246 A1 | 10/2009 | Alvarez et al. | |
| 2010/0023338 A1 | 1/2010 | Petronelli et al. | |
| 2010/0035689 A1 | 2/2010 | Altshuler et al. | |
| 2010/0058377 A1 | 3/2010 | Grob et al. | |
| 2010/0131443 A1 | 5/2010 | Agarwal et al. | |
| 2010/0262487 A1* | 10/2010 | Edwards et al. | 705/14.43 |
| 2010/0293566 A1* | 11/2010 | Valdez | 725/14 |
| 2010/0332329 A1* | 12/2010 | Roberts et al. | 705/14.66 |
| 2011/0119313 A1* | 5/2011 | Sung et al. | 707/802 |
| 2011/0126102 A1* | 5/2011 | Archer | 715/716 |
| 2011/0153612 A1* | 6/2011 | Paul et al. | 707/740 |
| 2011/0289534 A1* | 11/2011 | Jordan et al. | 725/48 |
| 2011/0307599 A1 | 12/2011 | Saretto et al. | |
| 2012/0005316 A1 | 1/2012 | Perry et al. | |
| 2012/0096289 A1* | 4/2012 | Kawakami et al. | 713/320 |
| 2012/0134291 A1* | 5/2012 | Raleigh | 370/252 |
| 2012/0142429 A1 | 6/2012 | Muller | |
| 2012/0158500 A1 | 6/2012 | Hochstatter et al. | |
| 2012/0254246 A1 | 10/2012 | Kerger et al. | |
| 2013/0045710 A1* | 2/2013 | Raleigh | 455/406 |
| 2013/0110854 A1* | 5/2013 | Lockhart et al. | 707/756 |
| 2013/0268557 A1 | 10/2013 | Pickersgill et al. | |
| 2014/0033081 A1* | 1/2014 | Fernandez et al. | 715/760 |
| 2014/0067855 A1 | 3/2014 | Shartzer et al. | |
| 2014/0143713 A1 | 5/2014 | Gudorf et al. | |

OTHER PUBLICATIONS

Gastin, et al., "Distributed games and distributed control for asynchronous systems", Retrieved at <<http://www.labri.fr/perso/zeitoun/recherche/articles/confs/04-LATIN/LATIN-04.pdf>>, In Proc. of Latin American Theoretical Informatics (LATIN'04), Apr. 2004, pp. 19.

ISA European Patent Office, International Search Report & Written Opinion for PCT Application No. PCT/US2013/066218, Jan. 20, 2014, 11 pages.

ISA European Patent Office, International Search Report & Written Opinion for PCT Application No. PCT/US2013/066211, Jan. 27, 2014, 8 pages.

Chen, et al., "User Identification based on Game-Play Activity Patterns",Retrieved at <<http://www.iis.sinica.edu.tw/~swc/pub/gamer_identification.html, Academia Sinica, Retrieved Date : Jul. 4, 2012, 15 Pages.

Burba, Alexander et al., "Recommending Content Based on Content Access Tracking" U.S. Appl. No. 13/658,751, filed Oct. 23, 2012, 27 pages.

Burba, Alexander et al., "Multiple Buffering Orders for Digital Content Item" U.S. Appl. No. 13/658,753, filed Oct. 23, 2012, 28 pages.

Isa European Patent Office, International Search Report and Written Opinion issued in Application No. PCT/US2013/066209, Jan. 27, 2014, Wipo, 8 pp.

\* cited by examiner

BUFFER ORDERING BASED ON CONTENT ACCESS TRACKING

BACKGROUND

A digital content item, such as a video game, may comprise a large amount of data, and therefore may take a potentially significant amount of time to download in full. To help prevent long waiting times, some digital content items may allow a user to begin interacting with the content before downloading is complete. However, a user interacting with the content may experience delays during play as the user reaches portions of the content that have not yet been downloaded.

SUMMARY

Embodiments are disclosed that relate to buffering portions of a digital content item in different orders for different users. For example, one disclosed embodiment provides a method of providing a buffer ordering for a digital content item. The method includes tracking content access information for each user of a plurality of users, the content access information for each user comprising information regarding how content portions of each of one or more digital content items were accessed by the user. The method further comprises providing a different buffer ordering for a first user of a selected digital content item than for a second user based upon the content access information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
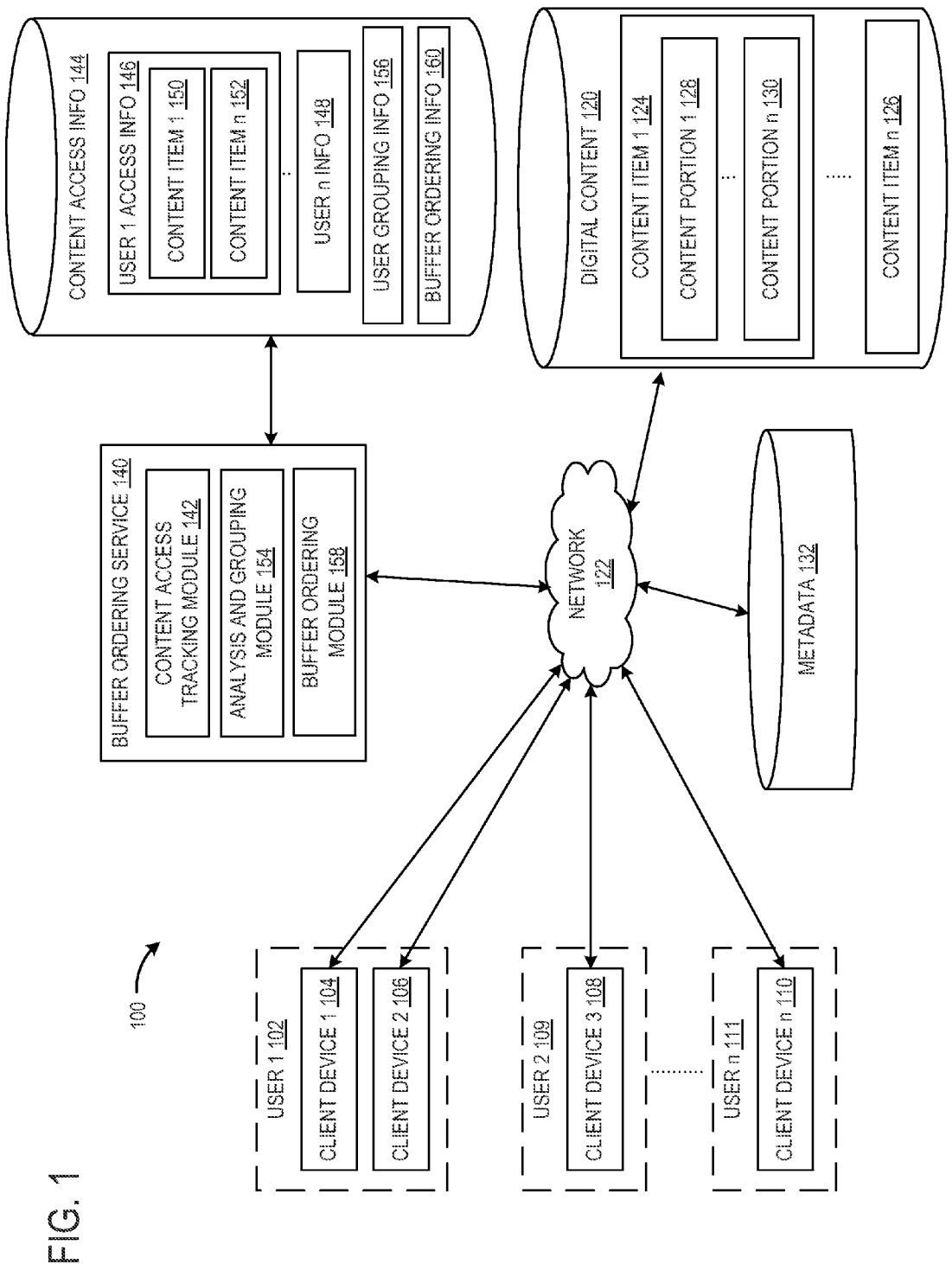
FIG. 1 shows an example embodiment of an interactive media environment.

As mentioned above, some digital content items, such as downloadable content items, may allow a user to begin interacting with the content before downloading is complete. However, a user interacting with the content may experience delays during play as the user reaches portions of the content that have not yet been downloaded.

Further, different users may encounter different delays, as the different users may consume digital content in different ways. For example, in the case of a video game, some users may play the game slowly and methodically, trying to solve all challenges in a level before progressing to a next level, while others may skip optional challenges and instead progress to higher levels as soon as possible. Different users also may choose to play a game as different characters, and/or otherwise customize an interactive media experience differently. Therefore, different delays may arise depending upon when different users reach different portions of the content not yet downloaded.

Such behaviors may be evident in the way that the users access the various portions of a digital content item. It will be understood that the terms "content portion" and the like denote any portion of data of the digital content item, and may or may not correspond to a discrete feature, file, object, etc. of the digital content item.

As a user downloads and progresses through a digital content item, the computing device with which the user is experiencing the digital content item may access various content portions that correspond, for example, to features of the particular portion of the interactive media content item currently being consumed by the user.

As a digital content item may be accessed by multiple users, tracking temporal information regarding how each user accesses portions of one or more digital content items may allow users with similar content access patterns to be identified. This may allow an order in which portions of other digital content items are buffered by different users to be selected based upon each user's past content asset patterns. It will be appreciated that such content access patterns may be tracked without reference to what the content portions represent, for example, by tracking content portions in the form of portions of memory (locations, disk sectors, memory offsets from a beginning of a digital content item, etc.) at which the content portions are accessed. This may allow users to be grouped without having to define any particular grouping scenario up front (e.g. user play style, avatar/character preference, genre preference, etc.), and without having to understand the underlying basis for the similarities in content access patterns.

In other embodiments, descriptive metadata may exist for content and/or portions thereof. In such embodiments, users may additionally be grouped by the comparison of such metadata. This may help to provide an understanding of the nature of the similarities underlying each grouping, and may offer additional information for determining an order in which portions of other content items are buffered for users.

Prior to discussing these embodiments in more detail, an example embodiment of a use environment 100 is described with reference to FIG. 1. Use environment 100 comprises a plurality of client devices each configured to receive and present digital content, wherein each client device is associated with a corresponding user. In some instances, more than one client device may be associated with a user. For example, a user may have two or more of a video game console, a mobile device, a computer (laptop, desktop, tablet), a wearable device (e.g. head-mounted display), etc., and may consume digital content on each of these devices. This is shown in FIG. 1 as a first user 102 having a first associated client device 104 (e.g. video game console) and a second associated client device 106 (e.g. mobile device, wearable device, portable device, computer, etc.). FIG. 1 also shows two other client devices associated with other users as client device 3 108 associated with user 2, and client device n 110 associated with user n 111 to illustrate the multi-user nature of use environment 100. While described in the context of a client-server environment, it will be understood that other embodiments may utilize any other suitable architecture, including but not limited to a peer-to-peer configuration.

Each client device is in communication with one or more digital content stores 120 (e.g. locations from which media content may be downloaded) via a network 122 (e.g. computer network, cellular phone network, and/or any other suitable type of network). Digital content store 120 is depicted as storing a plurality of digital content items, illustrated as digital content item 1 124 and digital content item n 126. Each client also may be in communication with one or more other client devices in a peer-to-peer arrangement for receiving content from peer devices.

Each digital content item comprises a plurality of content portions, examples of which are shown as content portion 1 128 and content portion n 130 for digital content item 1 124. Digital content items 124, 126 may represent any suitable type of digital content, including but not limited to interactive content such as video games, interactive video, and social media. Other examples include, but are not limited to, movies, television shows and other videos, music, photographs, websites, etc. Likewise, content portions 128, 130 may take any suitable form. For example, content portions 128, 130 may take the form of specific portions of memory (e.g. memory locations, disk sectors, etc.), or, by extension, specific files, etc.

As mentioned above, in some embodiments one or more digital content items and or portions of a digital content item may have associated descriptive metadata that describes an identity, characteristic, and/or other property of the content portion. For example, in the case of a video game, metadata 132 may comprise information regarding an identity of one or more virtual objects (e.g. character/object identification, location/setting, etc.) represented (partially or fully) by a content portion. Metadata 132 also may comprise information regarding the digital content item as a whole (e.g. genre), and/or any other suitable information. Such metadata is illustrated in FIG. 1 as being stored in a metadata store 132 that is located remotely from the digital content store 120. However, it will be understood that metadata 132 may be stored in any suitable location, including with the corresponding content item in some embodiments.

As mentioned above, content access information regarding how users access content items may be used to determine buffer orderings for other content items. Thus, a buffer ordering service 140 may receive and track temporal information regarding how users accessed digital content items, and may provide buffer orderings for other digital content items to client devices based upon similarities in the content access patterns of users. The depicted buffer ordering service 140 comprises a content access tracking module 142 configured to track content access information for users of buffer ordering service 140, and to store this information in a content access information store 144. Content access information store 144 may store content access information for a plurality of users, illustrated as user 1 information 146 and user n information 148, and likewise may store content access information for each digital content item accessed by each user, illustrated for user 1 146 as access information for content item 1 150 and access information for content item n 152. The content access information stored for each digital content item accessed by each user may comprise any suitable information, including but not limited to an order in which content portions of each digital content item were accessed by that user, and/or other such temporal information.

Content access information may be provided to the buffer ordering service 140 by client devices as users download and consume digital content on the client devices (or at a later time after downloading), by a digital content provision service that provides digital content to clients, and/or from any other suitable source. Further, in some embodiments, the buffer ordering service may be included with a digital provision service, and thus may monitor content access patterns as content is downloaded from the digital provision service.

Buffer ordering service 140 further comprises an analysis and grouping module 154 configured to analyze content access information, and to identify groups of users based, for example, upon similarities in content access patterns. Analysis and grouping module 154 may be configured to compare any suitable content access information to identify such groups of users. For example, analysis and grouping module 154 may compare content access information for a single digital content item, within a family of titles, within a selected genre, within multiple titles of different genres, and/or for any other suitable content. Further, as mentioned above, metadata also may be compared to help identify groups of similar users in some embodiments. The groupings determined by analysis and grouping module 154 may be stored as grouping information 156.

Buffer ordering service 140 may further comprise a buffer ordering module 158 configured to determine buffer orderings for digital content items based upon the content access information for a user compared to that of other users. Buffer orderings may be determined in any suitable manner For example, in some embodiments, buffer orderings 140 may access stored buffer ordering information for one or more digital content items, as shown at 160, wherein the stored buffer ordering information comprises a plurality of different buffer orderings for each of one or more digital content items. It will be understood that the buffer ordering information may comprise, for a selected digital content item, a different buffer ordering for each different group of similar users, fewer than one buffer ordering per group of similar users (e.g. such that two or more groups share a buffer ordering), or more than one buffer ordering per group of similar users.

The specific orders of content portions in each buffer ordering may be determined in any suitable manner. As one example, an initial buffer ordering or set of buffer orderings may be pre-selected by a developer (e.g. through beta testing), and then orderings for each group of similar users may be determined and/or refined based upon actual content access experience over time. As another example, a single initial buffer ordering may be defined, and then additional buffer orderings may be determined through analysis of content access patterns of end users over time.

Based upon the user grouping information 152 and the buffer ordering information 156 for a digital content item requested by a user, the buffer ordering module 154 may determine a buffer ordering for use in buffering the requested digital content item. In this manner, the tracking of information regarding how similar users accessed the assets of the requested digital content item may help to identify a buffer ordering for the requesting user that potentially matches the requesting user's digital content consumption style. This may help the requesting user consume digital content during downloading with less lag.

Figure 2:
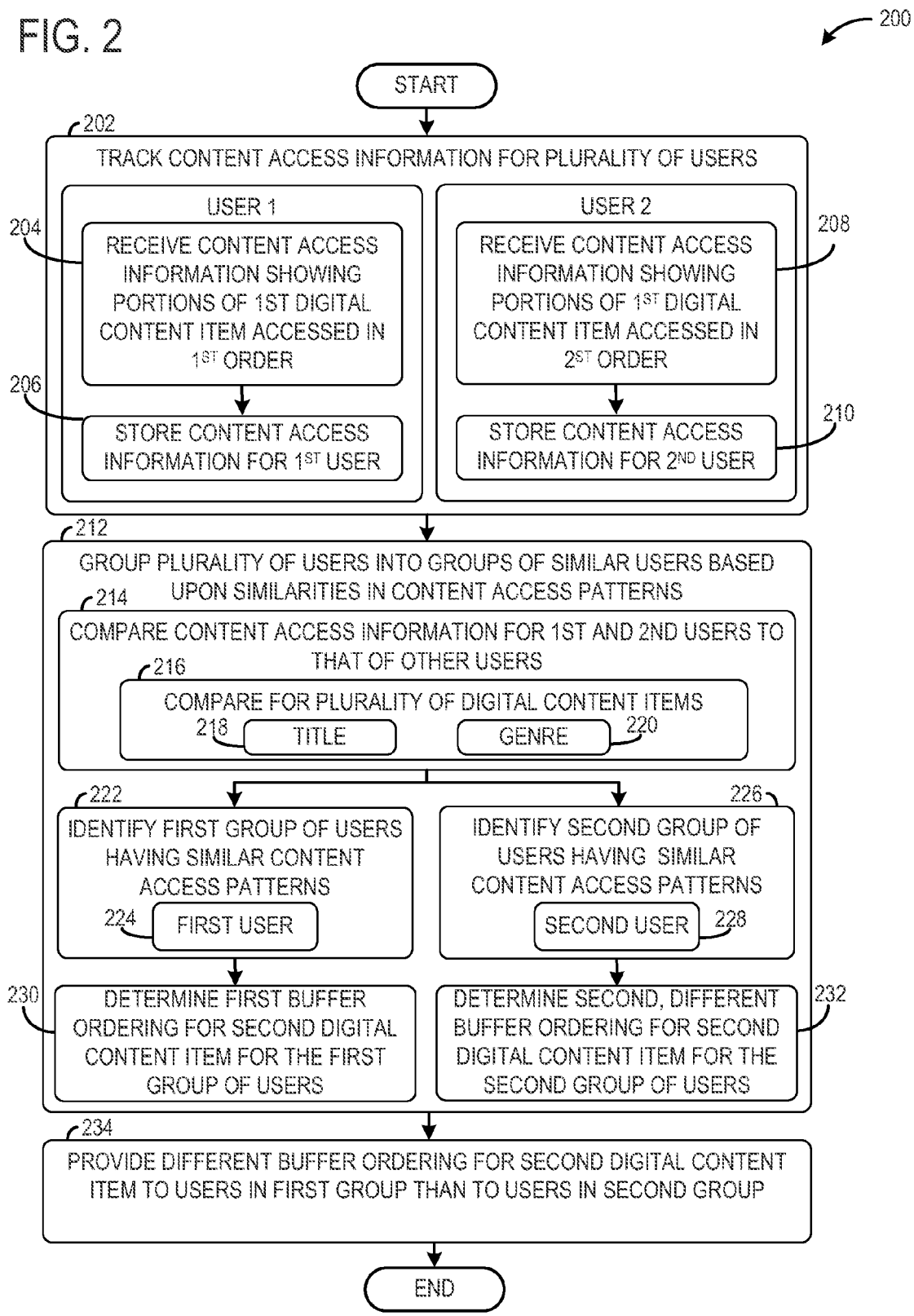
FIG. 2 shows a flow diagram depicting an embodiment of a method for providing different buffer orderings for a digital content item to different users.

FIG. 2 shows a flow diagram depicting an embodiment of a method 200 for determining an order in which to buffer portions of a content item based upon a user's content access patterns. Method 200 may be implemented via any suitable computing system, example embodiments of which are described below.

Method 200 comprises, at 202, tracking content access information for each user of a plurality of users. The content access information may comprise temporal information regarding the accessing of content portions of each of one or more digital content items obtained by each user. It will be understood that content access information may be stored for any suitable type or types of interactive content, including but not limited to video games.

One example of the tracking of content access information for two users is shown at 204-210. As a user consumes a digital content item, information regarding an order in which the user accesses portions of the digital content item may be tracked by the user's device and sent to the above described buffer ordering service. As such, method 200 includes, at 204, receiving content access information showing that portions of a first digital content item were accessed by user 1 in a first order. Method 200 further includes, at 206, storing this information for user 1.

Similarly, method 200 comprises, at 208, receiving content access information for a different user (user 2) that shows that the portions of the first content item were accessed in a second, different order. Method 200 additionally comprises, at 210, storing this information for user 2. While the receiving and storage of content access information is depicted for two example users in FIG. 2, it will be understood that such processes may be performed for any suitable number of users, and potentially very large numbers of users for popular digital content items.

As described above, the requested content portions may take any suitable form, including but not limited to specified portions of memory. The content access information may comprise any suitable information regarding the content portions requested by and/or sent to each requesting device. For example, the content access information for each user may comprise an order in which the content portions were requested by and/or sent to the requesting device. Further, in some embodiments, the content access information may include information regarding a relative time at which each content portion was accessed, and/or any other suitable information.

Figure 3:
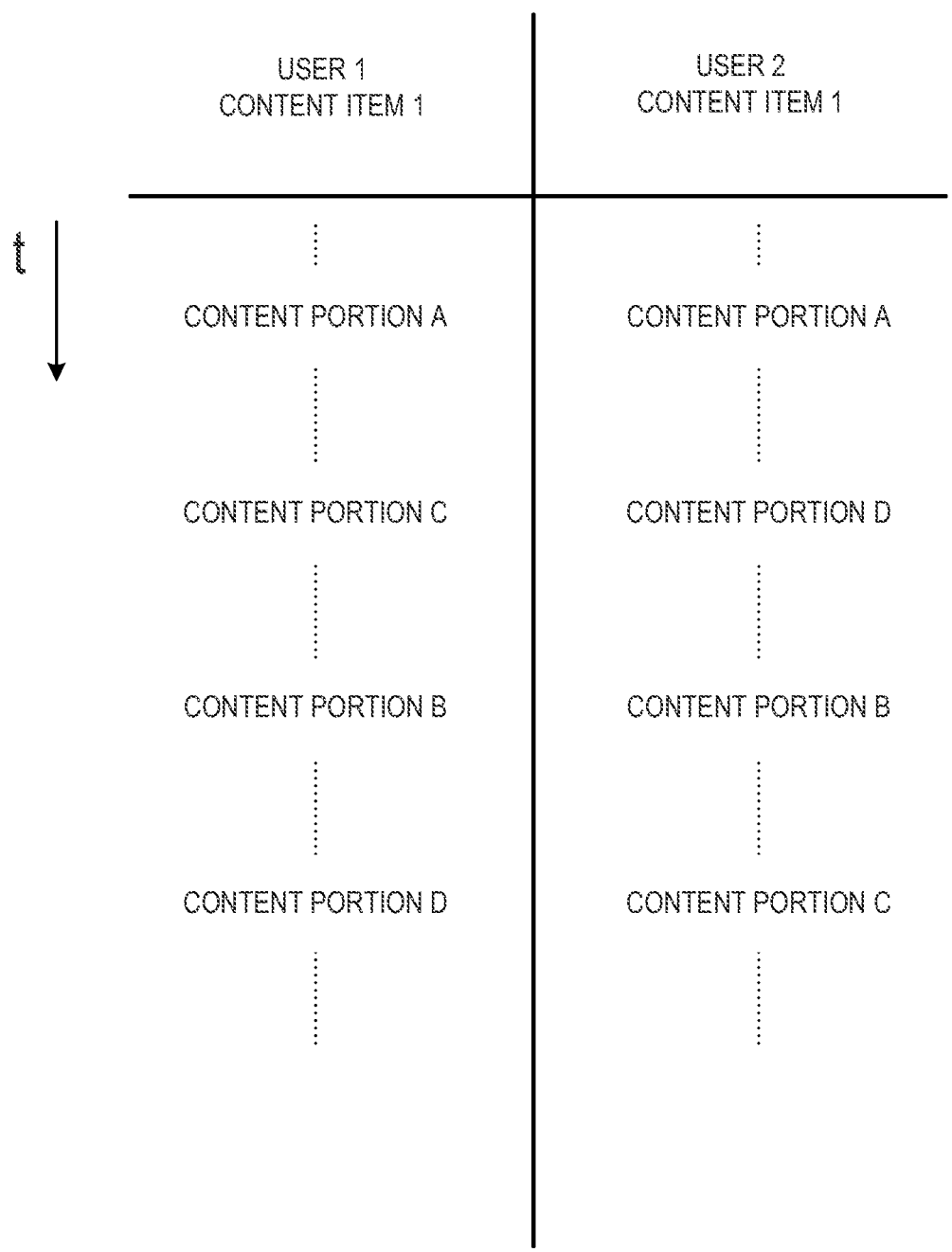
FIG. 3 shows a schematic depiction of an embodiment of content access information for two example users of a digital content item.

FIG. 3 shows a schematic depiction of a simplified example set of content access information for each of two users. In the depicted embodiment, a digital content item that was consumed by users 1 and 2 comprises an arbitrary set of content portions including portions a, b, c and d. A relative order in which each user accessed these content portions is illustrated on a vertical time axis, and shows that these four content portions were requested and sent in different orders for the two users. It will be understood that such content access information may be collected for any number of users that access an digital content item.

Continuing with FIG. 2, method 200 next comprises, at 212, grouping the plurality of users into groups of similar users based upon similarities in content access patterns. The plurality of users may be grouped into the groups of similar users in any suitable manner. For example, as indicated at 214, content access information for the first and second users may be compared (e.g. via a collaborative filtering algorithm) to content access information for a plurality of other users. In some embodiments, the content access information may be compared for a single digital content item to determine the groups of similar users. Further, in embodiments, as illustrated at 216, content access information for the plurality of users may be compared across a plurality of content items. Such items may be related by title 222, by genre 224, by any other suitable relationship, or even unrelated.

Based upon the comparison of content access information at 214, method 200 next comprises, at 222, identifying a first group of users having similar content access patterns, and at 224 identifying a second group of users having similar content access patterns. As the first and second users are illustrated as having different access asset patterns for the requested first content item, the first user is illustrated at 224 as being in the first group, and the second user is illustrated at 226 as being in the second group.

Continuing, method 200 comprises, at 230, determining a first buffer ordering for portions of a second digital content item for the first group of users, and at 232, determining a second, different buffer ordering for the portions of the second digital content item for the second group of users. The first and second buffer orderings may be determined in any suitable manner. For example, as mentioned above, the first and second buffer orderings may correspond to buffer orderings determined during product testing (e.g. beta testing performed during development process). Likewise, the first and second buffer orderings may correspond to the orders in which portions of the second content item were previously requested by similar end users. In either case, the first and second buffer orderings may be determined by determining which buffer orderings correspond to the first and second groups of users based upon content access pattern similarities within the user groups. It will be understood that buffer orderings, whether pre-selected or determined from end user experience, may be adjusted as user content access pattern data is acquired over time to allow the system to adjust to actual usage.

Method 200 next comprises, at 238, providing a different buffer ordering for the second digital content item for users in the first group than to users in the second group. In this manner, users of each group may receive the assets in a manner that may help to avoid interruptions in starting playback while downloading.

Figure 4:
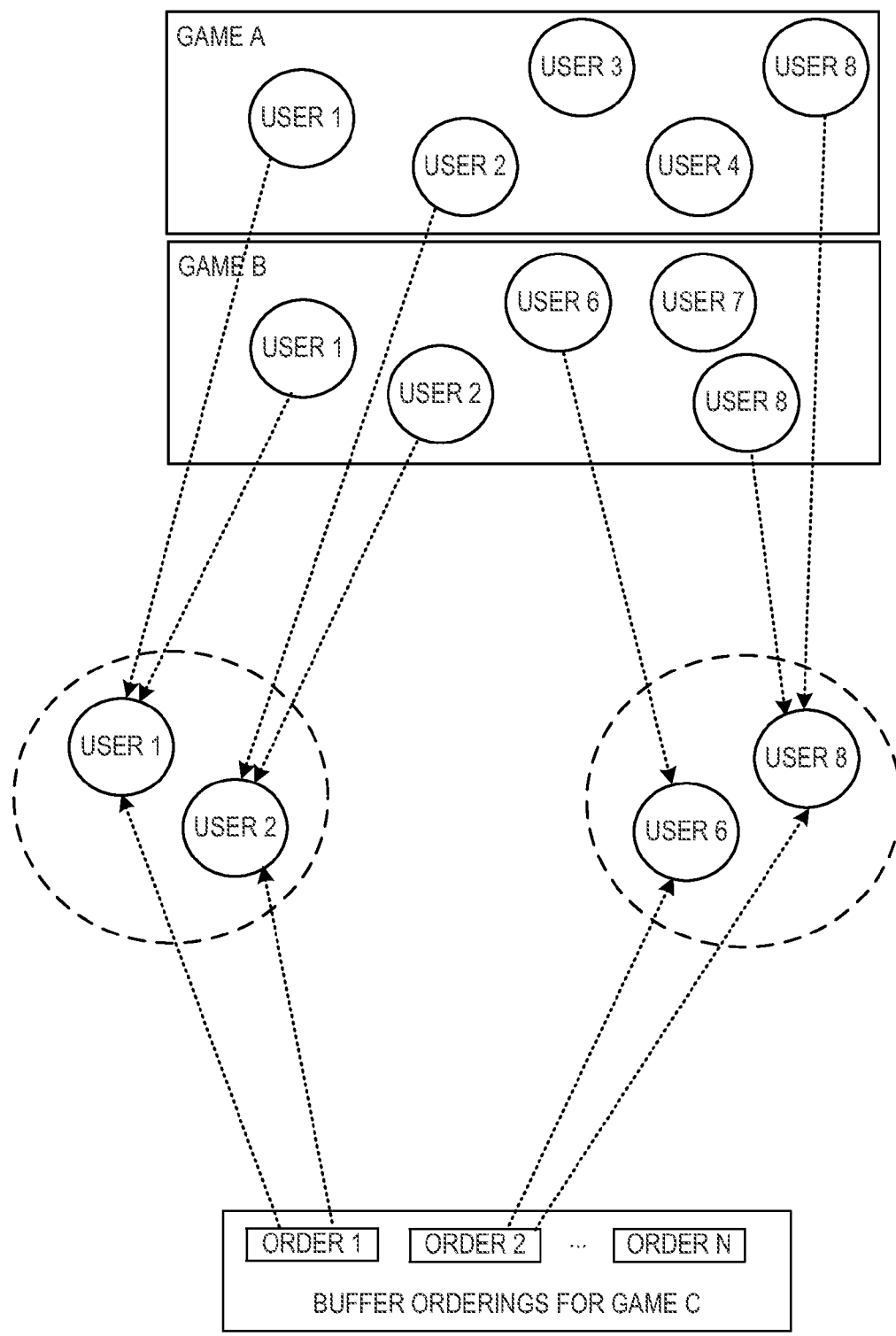
FIG. 4 shows a schematic depiction of a grouping of users based upon content access patterns for a plurality of digital content items.

FIG. 4 shows a schematic example of a grouping of users based upon content access patterns for a group of different digital content items, illustrated as video games A and B. Video games A and B may be related by title, genre, other characteristic or quality, or unrelated. It will be understood that any other suitable interactive content other than video games also may be used.

As shown, it may be determined via the above-described processes that user 1 and user 2 consumed content portions of game A and B (and potentially other games) in similar manners. Based upon this determination, user 1 and user 2 may be grouped together ("group 1"). Likewise, it may be determined that user 6 and user 8 accessed game B (and potentially other games) in a similar manner. Thus, user 6 and user 8 may be similarly grouped together ("group 2"). Then, when users 1 and 2 request to play game C, a first buffer ordering for game C may be used to provide game C to users 1 and 2, wherein the first buffer ordering corresponds to an order determined and/or adapted based upon the content access patterns of group 1 members. In contrast, when users 6 and 8 request to play game C, a second buffer ordering for game C may used to provide game C to users 6 and 8. While two user groups are shown for clarity in FIG. 4, it will be understood that any suitable number of groups, and any suitable number of corresponding buffer orderings, may be used.

It will be understood that the tracking and analysis of content access information also may facilitate the generation of business intelligence information per content per group of similar users. This may allow data such as game heat maps, exit points, and any other suitable information to be determined for groups of users. Such information may be based upon historical statistical values, and/or may be used to predict behavior of users from each group based upon a subgroup of representatives from that group.

In some embodiments, the methods and processes described above may be tied to a computing system of one or more computing devices. In particular, such methods and processes may be implemented as a computer-application program or service, an application-programming interface (API), a library, and/or other computer-program product.

Figure 5:
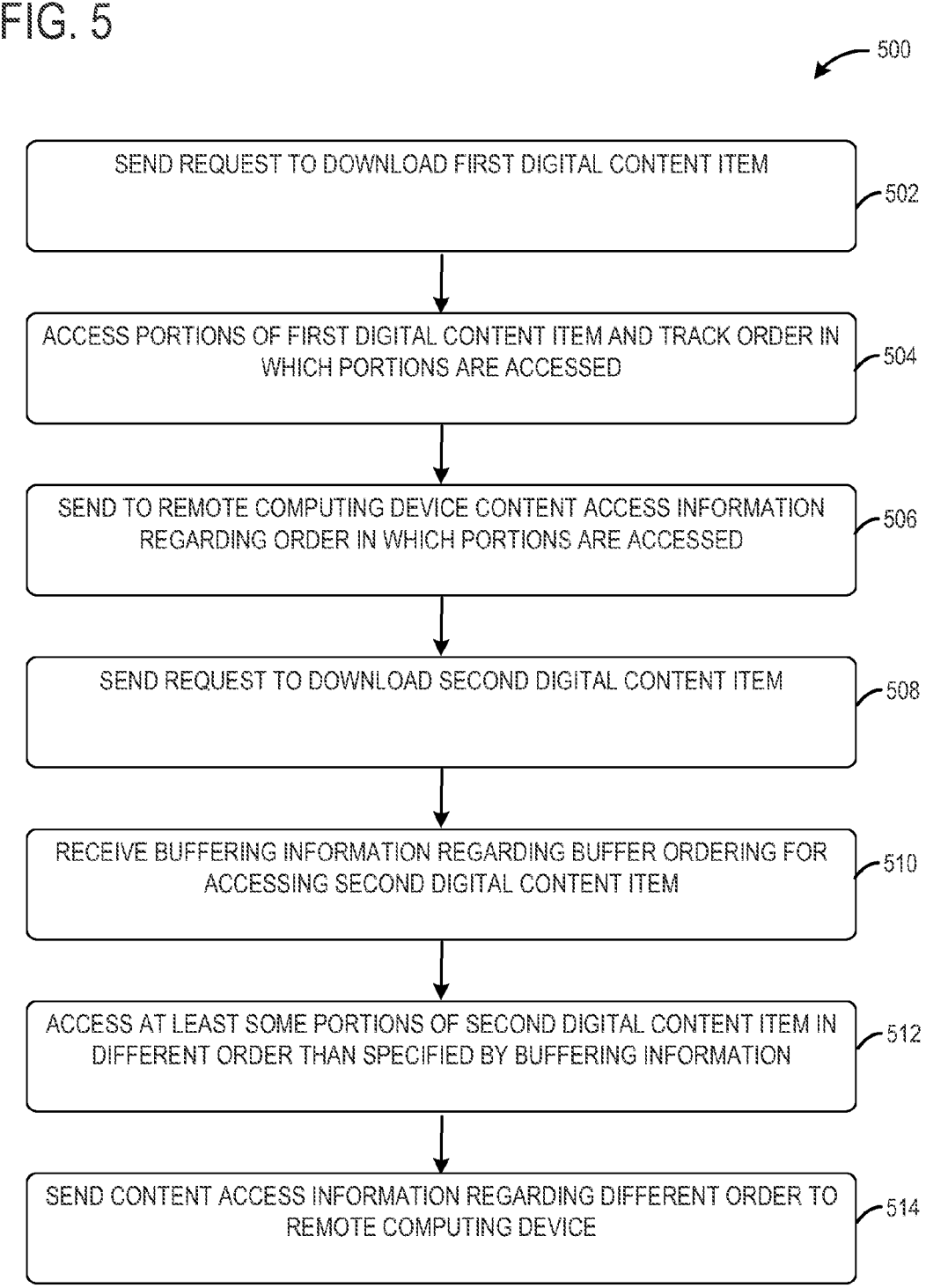
FIG. 5 shows a flow diagram depicting an embodiment of a method of presenting digital content to a user.

FIG. 5 shows a flow diagram depicting an embodiment of a method 500 of presenting digital content to a user via a computing device. Method 500 comprises, at 502, sending a request to download a first digital content item. Next, at 504, method 500 comprises accessing portions of the first digital content item and tracking an order in which the portions of the first digital content item are accessed. The portions of the first digital content item may be accessed from any suitable location, including but not limited to a content provision service, as well as local sources. Method 500 further comprises, at 506, sending to a remote computing device information regarding the order in which the portions of the first video game are accessed. For example, this information may be sent to the buffer ordering service of FIG. 1 or similar service.

Continuing, method 500 comprises at 508, sending a request to access a second digital content item, and at 510, receiving buffering information regarding a buffer ordering for accessing the second digital content item. The buffer ordering may be determined based at least in part on the order in which portions of the first digital content item were accessed, such that different buffer orderings for the second digital content item may be used by different users. Next, method 500 comprises, at 512, accessing at least some portions of the second digital content item in an order specified by the buffering information. In some cases, an entirety of the second digital content item may be accessed in the order specified by the buffering information. In other cases, a user may consume some portions of the digital content item in a different order than that in the buffering information, and thus may access those portions in a different order. In such instance, method 500 may comprise, at 514, sending content access information regarding the different content access ordering to the remote computing device. This information may then be used by the remote computing device to adapt the buffer orderings for future content requests by similar users.

Figure 6:
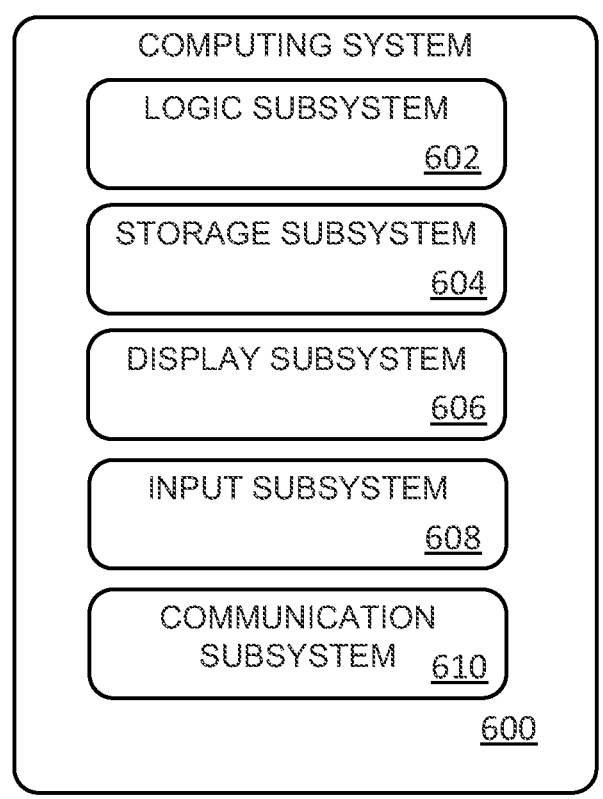
FIG. 6 shows a block diagram illustrating an example embodiment of a computing device.

FIG. 6 schematically shows a non-limiting embodiment of a computing system 600 that can enact one or more of the methods and processes described above. Computing system 600 is shown in simplified form. It will be understood that virtually any computer architecture may be used without departing from the scope of this disclosure. In different embodiments, computing system 600 may take the form of a mainframe computer, server computer, desktop computer, laptop computer, tablet computer, home-entertainment computer, network computing device, gaming device, mobile computing device, mobile communication device (e.g., smart phone), etc.

Computing system 600 includes a logic subsystem 602 and a storage subsystem 604. Computing system 600 may optionally include a display subsystem 606, input subsystem 608, communication subsystem 610, and/or other components not shown in FIG. 6.

Logic subsystem 602 includes one or more physical devices configured to execute instructions. For example, logic subsystem 602 may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

Logic subsystem 602 may include one or more processors configured to execute software instructions. Additionally or alternatively, logic subsystem 602 may include one or more hardware or firmware logic machines configured to execute hardware or firmware instructions. The processors of logic subsystem 602 may be single-core or multi-core, and the programs executed thereon may be configured for sequential, parallel or distributed processing. Logic subsystem 602 may optionally include individual components that are distributed among two or more devices, which can be remotely located and/or configured for coordinated processing. Aspects of logic subsystem 602 may be virtualized and executed by remotely accessible, networked computing devices configured in a cloud-computing configuration.

Storage subsystem 604 includes one or more physical, non-transitory, devices configured to hold data and/or instructions executable by the logic subsystem to implement the methods and processes described herein. When such methods and processes are implemented, the state of storage subsystem 604 may be transformed—e.g., to hold different data.

Storage subsystem 604 may include removable media and/or built-in devices. Storage subsystem 604 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 606 may include volatile, nonvolatile, dynamic, static, read/write, read-only, random-access, sequential-access, location-addressable, file-addressable, and/or content-addressable devices.

It will be appreciated that storage subsystem 604 includes one or more physical, non-transitory devices. However, in some embodiments, aspects of the instructions described herein may be propagated in a transitory fashion by a pure signal (e.g., an electromagnetic signal, an optical signal, etc.) that is not held by a physical device for a finite duration. Furthermore, data and/or other forms of information pertaining to the present disclosure may be propagated by a pure signal.

In some embodiments, aspects of logic subsystem 602 and of storage subsystem 604 may be integrated together into one or more hardware-logic components through which the functionally described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

The terms "module" and "program" may be used to describe an aspect of computing system 600 implemented to perform a particular function. In some cases, a module or program may be instantiated via logic subsystem 602 executing instructions held by storage subsystem 604. It will be understood that different modules and/or programs may be instantiated from the same application, service, code block, object, library, routine, API, function, etc. Likewise, the same module and/or program may be instantiated by different applications, services, code blocks, objects, routines, APIs, functions, etc. The terms "module" and "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage subsystem 606. This visual representation may take the form of a graphical user interface (GUI). As the herein described methods and processes change the data held by the storage subsystem, and thus transform the state of the storage subsystem, the state of display subsystem 606 may likewise be transformed to visually represent changes in the underlying data. Display subsystem 606 may include one or more display devices utilizing virtually any type of technology. Such display devices may be combined with logic subsystem 602 and/or storage subsystem 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, steroscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, communication subsystem 610 may be configured for communication via a wireless telephone network, or a wired or wireless local- or wide-area network. In some embodiments, communication subsystem 610 may allow computing system 600 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device, a method of providing a buffer ordering for an executable digital content item, the method comprising:
    tracking content access information for each user of a plurality of users, the content access information for each user comprising information regarding how memory locations of content portions of each of one or more executable digital content items were accessed by the user;
    grouping the plurality of users into groups of similar users based upon similarities in content access patterns; and
    for a selected executable digital content item, providing a different buffer ordering to one or more users in a first group of similar users than to one or more users in a second group of similar users based upon how the memory locations were accessed.

2. The method of claim 1, wherein the content access information for each user comprises information regarding an order in which the memory locations of the content portions of each of the one or more executable digital content items were accessed by the user.

3. The method of claim 1, wherein grouping the plurality of users into groups of similar users based upon similarities in content access patterns comprises comparing content access information of the plurality of users for a single executable digital content item.

4. The method of claim 1, wherein grouping the plurality of users into groups of similar users based upon similarities in content access patterns comprises comparing content access patterns of the plurality of users for a plurality of executable digital content items.

5. The method of claim 4, wherein the plurality of executable digital content items are related by one or more of title and genre.

6. A computing device, comprising
    a logic subsystem; and
    a storage subsystem comprising instructions stored thereon that are executable by the logic subsystem to:
        receive content access information for a first user of a first executable digital content item, the content access information for the first user showing memory locations of content portions of the first executable digital content item accessed in a first order;
        receive content access information for a second user of the first executable digital content item, the content access information for the second user showing the memory locations of the content portions of the first executable digital content item accessed in a second, different order than the first order;
        store the content access information for the first user and the content access information for the second user;
        receive a request associated with the first user for a second executable digital content item;
        receive a request associated with the second user for the second executable digital content item; and
        based upon the content access information for the first user and the content access information for the second user for the first executable digital content item, provide to the first user a different buffer ordering for the second executable digital content item than to the second user.

7. The computing device of claim 6, wherein the content access information for each user comprises information regarding an order in which the memory locations of the content portions of the first executable digital content item were accessed by that user.

8. The computing device of claim 6, wherein the first executable digital content item and second executable digital content item each comprises a video game.

9. The computing device of claim 6, wherein the instructions are further executable to compare the content access information for the first user and the content access information for the second user to content access information for a plurality of other users to identify a first group of users having similar content access patterns and a second group of users having similar content access patterns, the first group of users comprising the first user and the second group of users comprising the second user.

10. The computing device of claim 9, wherein the instructions are further executable to determine a first buffer ordering for the second executable digital content item for the first group of users and a second, different buffer ordering for the second group of users.

11. The computing device of claim 9, wherein the instructions are further executable to compare the content access information for the first user and the content access information for the second user to content access information for a plurality of other users by comparing content access information for a plurality of executable digital content items.

12. The computing device of claim 11, wherein the plurality of executable digital content items are related by one or more of title and genre.

13. A computing device, comprising
a logic subsystem; and
a storage subsystem comprising instructions stored thereon that are executable by the logic subsystem to:
track content access information for each user of a plurality of users, the content access information for each user comprising information regarding how memory locations of content portions of each of one or more executable digital content items were accessed by the user;
group the plurality of users into groups of similar users based upon similarities in content access patterns; and
for a selected executable digital content item, provide a different buffer ordering to one or more users in a first group of similar users than to one or more users in a second group of similar users based upon how the memory locations were accessed.

14. The computing device of claim 13, wherein the content access information for each user comprises information regarding an order in which the memory locations of the content portions of each of the one or more executable digital content items were accessed by the user.

15. The computing device of claim 13, wherein the instructions are executable to group the plurality of users into groups of similar users by comparing content access information of the plurality of users for a single executable digital content item.

16. The computing device of claim 13, wherein the instructions are executable to group the plurality of users into groups of similar users by comparing content access information of the plurality of users for a plurality of executable digital content items.

17. The computing device of claim 16, wherein the plurality of executable digital content items are related by one or more of title and genre.

* * * * *